Newton J. Harris. Cultivator.
117279

PATENTED JUL 25 1871

Witnesses:
E. Wolff
Wm. H. C. Smith

Inventor:
Newton J. Harris
pr. [signature]
Attorneys.

UNITED STATES PATENT OFFICE.

NEWTON J. HARRIS, OF MEREDOSIA, ILLINOIS.

IMPROVEMENT IN CULTIVATORS.

Specification forming part of Letters Patent No. 117,279, dated July 25, 1871.

*To all whom it may concern:*

Be it known that I, NEWTON J. HARRIS, of Meredosia, in the county of Morgan and State of Illinois, have invented a new and useful Improvement in Cultivator; and I do hereby declare that the following is a full, clear, and exact description thereof, which will enable others skilled in the art to make and use the same, reference being had to the accompanying drawing forming part of this specification, in which—

Figure 1:
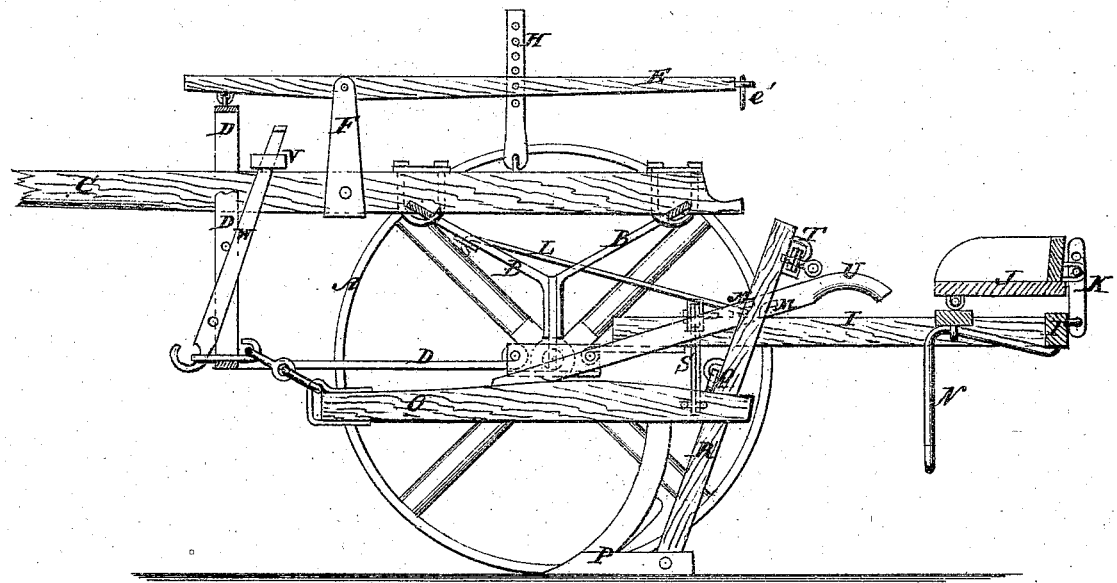
Figure 2:
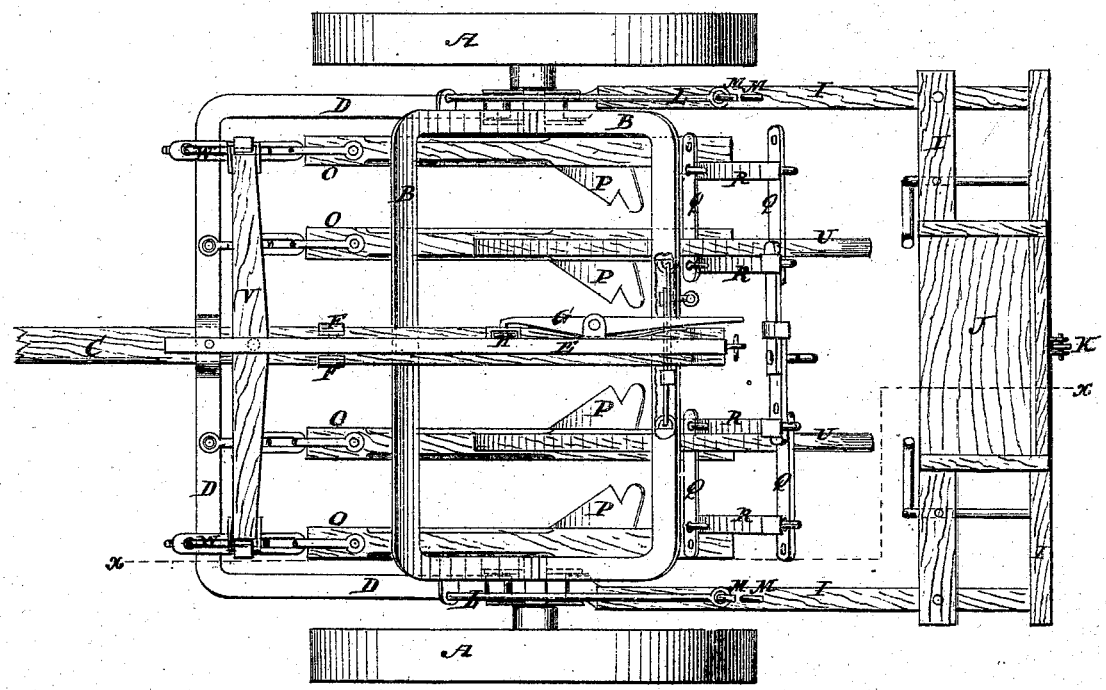

Figure 1 is a detail vertical longitudinal section of my improved cultivator taken through the line $x\ x$, Fig. 2. Fig. 2 is a top view of the same.

Similar letters of reference indicate corresponding parts.

My invention consists in the improvement upon cultivators, which is hereinafter fully described and subsequently pointed out in the claim.

A are the wheels which revolve upon the journals of the axle B. The axle B is made in two parts inclining from each other and bent upward, as shown in Figs. 1 and 2, so as to be out of the way of the plow-beams, to brace itself strongly and to furnish a firm support for the tongue C, which is securely attached to the centers of the said parts. D is the draft-bar, the ends of which are hinged to the axle B near the hubs of the wheels A. The bar D projects forward, is bent inward, and its middle part is bent upward into the form of an inverted U to receive the tongue C and allow the bar to be raised and lowered vertically while being held securely against lateral movement. The upward movement of the bar D may be limited by a bolt, rod, or rivet passed through the bent part of the said bar D beneath the said tongue C. To the top of the bend of the bar D is pivoted the forward end of the lever E, which is pivoted to supports F, the lower ends of which are attached or pivoted to the tongue C. The rear end of the lever E extends back into such a position that it can be conveniently reached and operated by the driver from his seat. G is a spring-catch lever which extends along the side of the lever E, and the forward end of which is hooked or bent inward to enter one or the other of the holes in the bar H, the lower end of which is pivoted to the tongue C, and which passes up through a keeper attached to the lever E. To the rear end of the lever E is pivoted a ring or link, $e'$, which may be slipped over the rear end of the catch-lever G to hold its engaging end away from the lever E when the plows are at work. I is the seat-frame, the forward ends of the side bars of which are hinged to the axle B at the inner ends of the hubs of the wheels A. J is the driver's seat, the forward part of the bottom of which is hinged to the forward cross-bar of the frame I. The rear part of the seat J is supported by a bar, K, the lower end of which is pivoted to the rear cross-bar of the frame I, and which is connected with the said seat J by a pin passing through one or the other of the holes through the said bar K and through eyes or staples attached to the said seat J. This arrangement enables the seat to be made level however the seat-frame I be adjusted. The seat-frame I and seat J are supported by the rods L, the forward ends of which are connected with eyes attached to the axle B, and the rear ends of which are hooked upon one or the other of the hooks M attached to the said seat-frame I, according as it is desired to have the seat supported in a higher or lower position. N are foot-rests, which are attached to the seat-frame I in proper position to receive the driver's feet. O are the plow-beams, the forward ends of which are pivoted to the front horizontal parts of the draft-bar D, and to the rear parts of which are attached the plows P. The plows O P are arranged to work two upon each side of the row of plants to be cultivated. The plows of each pair are connected by short bars Q, which are attached to the uprights R attached to the rear part of the plow-beams O, several holes being formed in each bar Q to receive the bolt or staple, so that the plows O P can easily be adjusted further apart or closer together, as may be desired. The inner plows of the two pairs are connected to each other by the bars S and T. The outer ends of the bars S are attached to the rear parts of the beams O. The bars S extend upward, are bent inward, overlap each other, and are adjustably secured to each other by bolts or other convenient fastenings. The outer ends of the bars T are attached to the upper ends of the uprights R of the inner plows of the two pairs, and their inner ends overlap and are adjustably secured to each other by a bolt or other fastening. By this arrangement, by adjusting the bars S and T the pairs of plows may be adjusted to work closer to or further from the row of plants being cultivated, as may be desired. To the beam O and standard R of the inner plow of each pair is attached a handle, U, which extends back into such a position that it may be conveniently reached by the driver to guide the plows. V is the evener, which is pivoted at its center to the tongue C just in the rear of the bend of the draft-bar D. W are the draft-rods, the upper parts of which pass through and slide in eyes or keepers attached to the ends of the evener V. The lower ends of the draft-rods W are pivoted to the draft-bar D, and upon their lower ends are formed hooks to receive the whiffletrees.

The evener V and draft-rods W are used when tall plants are being cultivated. When cultivating low plants a draft-bar may be attached to the eye that receives the draft-rods W, and to this draft-bar may be attached an ordinary double-tree and whiffletrees.

Having thus described my invention, I claim as new and desire to secure by Letters Patent—

The frame D, constructed as described and having plow-beams O attached thereto, in combination with lever E and perforated bar H, as and for the purpose specified.

NEWTON J. HARRIS.

Witnesses:
BARNY SCHLICKER,
HARMAN × HEMME.
his
mark.